United States Patent
Geppert et al.

(10) Patent No.: US 11,810,745 B2
(45) Date of Patent: Nov. 7, 2023

(54) APPARATUS FOR COMPENSATING FOR RESISTANCE TOLERANCES OF A FUSE FOR A CIRCUIT AND LINE DRIVER FOR A CONNECTION OF A COMMUNICATION DEVICE

(71) Applicant: Siemens Aktiengesellschaft, Munich (DE)

(72) Inventors: Michael Geppert, Ottersweier (DE); Reinhard Bachmann, Lingenfeld (DE); Jens Gottron, Karlsruhe (DE); Arnold Klamm, Kandel (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/708,092

(22) Filed: Mar. 30, 2022

(65) Prior Publication Data
US 2022/0319791 A1    Oct. 6, 2022

(30) Foreign Application Priority Data

Mar. 31, 2021   (EP) ..................................... 21166260

(51) Int. Cl.
*H01H 85/055*    (2006.01)
*H01H 85/02*    (2006.01)
*H04B 1/04*    (2006.01)

(52) U.S. Cl.
CPC ...... *H01H 85/0241* (2013.01); *H01H 85/055* (2013.01); *H04B 1/04* (2013.01)

(58) Field of Classification Search
CPC .......... H01H 7/00; H01H 37/32; H01H 37/34; H01H 37/761; H01H 69/02; H01H 83/10;
(Continued)

(56) References Cited

U.S. PATENT DOCUMENTS

2004/0239373 A1    12/2004   Seshita
2005/0162799 A1    7/2005   Anand et al.
(Continued)

FOREIGN PATENT DOCUMENTS

CN    102177687    9/2011
CN    204377221 U    6/2015
(Continued)

OTHER PUBLICATIONS

Wang et al. "Improvement and its parameter optimization of output filter in current balance compensation inverter for electrified railway", High Voltage Engineering vol. 37, No. 2, pp. 460-467, Feb. 28, 2011.
(Continued)

*Primary Examiner* — Shawkat M Ali
(74) *Attorney, Agent, or Firm* — Cozen O'Connor

(57) ABSTRACT

An apparatus for compensating for resistance tolerances of a fuse for a circuit, wherein the apparatus is particularly intended for use in a line driver for a communication device and includes a tolerance-affected fuse, a first resistor connected in series with the fuse, and a second resistor connected in parallel with the fuse and the first resistor, where the apparatus has, at a predefined ambient temperature, a resistance that corresponds to a desired total resistance, where the resistance of the second resistor is, depending on a power input into the apparatus in a fault state and/or depending on a predefined tolerance of the resistance of the apparatus, a multiple of that of the first resistor.

14 Claims, 1 Drawing Sheet

(58) Field of Classification Search
CPC ........ H01H 85/02; H01H 85/04; H01H 85/46;
H01H 85/055; H01H 58/0241; H02H
1/00; H02H 1/06; H02H 5/04; H02H
3/08; H02H 3/20; H04B 1/04
USPC .... 337/143, 159, 187, 416; 361/42, 45, 104,
361/115; 375/219, 295
See application file for complete search history.

(56) References Cited

U.S. PATENT DOCUMENTS

| | | |
|---|---|---|
| 2008/0137258 A1 | 6/2008 | Linder et al. |
| 2011/0199131 A1 | 8/2011 | Boezen |
| 2015/0364286 A1* | 12/2015 | Kang ............... H02H 9/041 337/227 |
| 2016/0268795 A1* | 9/2016 | Meng ............... H02H 9/026 |
| 2017/0076900 A1* | 3/2017 | Iwai ............... H01H 85/36 |
| 2017/0302165 A1 | 10/2017 | Marcinkiewicz et al. |
| 2018/0096807 A1 | 4/2018 | Yang |
| 2019/0140245 A1 | 5/2019 | Mensch et al. |
| 2020/0389009 A1 | 12/2020 | Troyer |

FOREIGN PATENT DOCUMENTS

| | | |
|---|---|---|
| CN | 105228057 | 1/2016 |
| CN | 205092963 U | 3/2016 |
| CN | 207819752 U | 9/2018 |
| CN | 109155584 | 1/2019 |
| CN | 112054662 | 12/2020 |
| JP | 2002-313927 | 10/2002 |
| KR | 19980060849 | 10/1998 |

OTHER PUBLICATIONS

Xia et al. "Pilot impedance of performance analysis for transmission lines with series compensation", Journal of Xi'an Jiaotong University, vol. 45, No. 6, pp. 97-103, Jun. 2011.

\* cited by examiner

APPARATUS FOR COMPENSATING FOR RESISTANCE TOLERANCES OF A FUSE FOR A CIRCUIT AND LINE DRIVER FOR A CONNECTION OF A COMMUNICATION DEVICE

BACKGROUND OF THE INVENTION

1. Field of the Invention

The present invention relates to an apparatus for compensating for resistance tolerances of a fuse for a circuit and to a line driver comprising the apparatus, for a connection of a communication device, in particular of a communication device for a 2-wire Ethernet bus system within an industrial automation system, where the line driver may be integrated in the communication device or can form external components for a communication device that does not have an integrated line driver.

2. Description of the Related Art

Industrial automation systems usually comprise a multiplicity of automation devices networked to one another via an industrial communication network and, within the scope of production or process automation, are used to control or regulate installations, machines or devices. Time-critical constraints in industrial automation systems mean that predominantly realtime communication protocols, such as PROFINET, PROFIBUS, realtime Ethernet or time-sensitive networking (TSN), are used for communication between automation devices. In particular, control services and applications can be automated and distributed, depending on usage, across currently available servers or virtual machines of an industrial automation system.

Interruptions in communication connections between computer units of an industrial automation system or automation devices may result in undesirable or unnecessary repetition of the transmission of a service request. In addition, messages which have not been transmitted or have not been completely transmitted may prevent an industrial automation system from changing to or remaining in a safe operating state, for example.

Problems can arise in Ethernet-based communication networks if network resources for transmitting data streams or data frames with realtime demands are used in a competing manner to transmit data frames having a large payload content without specific quality of service demands. This can ultimately lead to data streams or data frames with realtime demands not being transmitted in accordance with a demanded or required quality of service.

Ethernet Advanced Physical Layer (Ethernet APL) is an OSI Layer 1 extension, which specifically takes into account demands in the process industry. The focus is in particular on high-speed communication over long distances and also on 2-core cables and protective measures for safe operation within potentially explosive areas. An electronic circuit is provided in each case at outputs and inputs of switches and field devices as a barrier for producing intrinsic safety. Such circuits prevent ignitable electrical energy from entering connections. In particular, devices that are operated in potentially explosive areas have to be protected by a protection class in accordance with International Electrotechnical Commission (IEC) standard series IEC60079. This ensures that an explosive environment cannot be ignited by hot surfaces or spark generation even in the case of multiple faults. This is achieved through reliable limiting of voltages and currents in circuits designed to be intrinsically safe.

Fuses are frequently used to limit current or power, in particular when currents that are to be limited result in high losses or only low-value resistors are intended to be used. However, in comparison to resistors, fuses have high cold resistance tolerances and high temperature coefficients. Especially if signal lines with defined terminating resistances are intended to be protected by fuses, it is problematic that the terminating resistances are highly dependent both on a respective batch of the fuses and on ambient temperatures. To avoid mismatches in signal transmission systems, a respective total resistance is not permitted to exceed predefined tolerances, because otherwise it is sometimes the case that communication is impossible or conditions for compliance checks are not met.

SUMMARY OF THE INVENTION

In view of the foregoing, it is therefore an object of the present invention to provide an apparatus that comprises a fuse and which is suitable, despite the cold resistance tolerances and temperature coefficients of the fuse, for reliable power adjustment or current limitation particularly in potentially explosive environments, and to provide a suitable solution for integrating the invention in communication devices.

This and other objects and advantages are achieved in accordance with the invention by a line driver and an apparatus for compensating for resistance tolerances of a fuse for a circuit that comprises a tolerance-affected fuse and a first resistor, which is connected in series with the fuse. A second resistor is connected in parallel with the fuse and with the first resistor.

In accordance with the invention, the apparatus has, at a predefined ambient temperature, a resistance that corresponds to a desired total resistance. The resistance of the second resistor is, depending on a power input into the apparatus in a fault state and/or depending on a predefined tolerance of the resistance of the apparatus, a multiple of that of the first resistor. This particularly makes it possible to compensate for high resistance tolerances of the fuse by designing the second resistor to have an appropriately high value in comparison to the first resistor. Conversely, a low power input into the apparatus, which is desirable in potentially explosive environments, can be achieved in the event of a fault if the first resistor and the second resistor have values of a similar order of magnitude. In general, the opening of a parallel branch via the second resistor results in a significant reduction in tolerance of the total resistance.

At the predefined ambient temperature, the fuse may have a tolerance, with respect to its resistance, of at least 5%. The predefined ambient temperature is preferably 25° C. In particular, within a predefined temperature range, the fuse may have a tolerance, with respect to its resistance, of at least 20%. The predefined temperature range comprises, for example, at least a range between −40° C. and 80° C. In the abovementioned cases, the opening of the parallel branch with the second resistor is particularly efficient for compensating for the resistance tolerances of the fuse, particularly in comparison with selecting a fuse with relatively low resistance tolerances at increased cost. This particularly also applies if, within the predefined temperature range, the fuse has a temperature coefficient of 0.4% per degree Kelvin or higher.

Furthermore, the opening of the parallel branch with the second resistor proves particularly advantageous for compensating for the resistance tolerances of the fuse if, within the predefined temperature range, the first resistor and/or the second resistor have/has a tolerance, with respect to their respective/its resistance, of at most 0.1%. Here, higher resistance tolerances of the fuse in the range above 5% can also be satisfactorily compensated for at the predefined ambient temperature.

In accordance with a preferred embodiment of the present invention, the resistance of the second resistor is predefined depending on the power input into the apparatus when the fuse melts. The apparatus is thus particularly suitable for use in potentially explosive environments. Moreover, it is possible to compensate for high resistance tolerances of the fuse very effectively if, in relation to the first resistor, the second resistor has a resistance value at least ten times higher.

The line driver according to the invention is suitable for a connection of a communication device comprising a physical layer (PHY) interface apparatus to a two-wire Ethernet bus system and comprises an apparatus in accordance with the aforementioned embodiments. The line driver comprises a bridge rectifier, which comprises two bus-side connections and two device-side connections. In addition, the line driver comprises a first high-pass filter arrangement, which can be connected to a first transmission unit of the PHY interface apparatus of the communication device, and a second high-pass filter arrangement, which can be connected to a second transmission unit of the PHY interface apparatus of the communication device. The first high-pass filter arrangement and the second high-pass filter arrangement each comprise an apparatus according to aforementioned embodiments. The line driver may in particular be in the form of a line driver integrated in a communication device. Alternatively, an embodiment as an external device is also possible.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DESCRIPTION OF THE EXEMPLARY EMBODIMENTS

Figure 1:
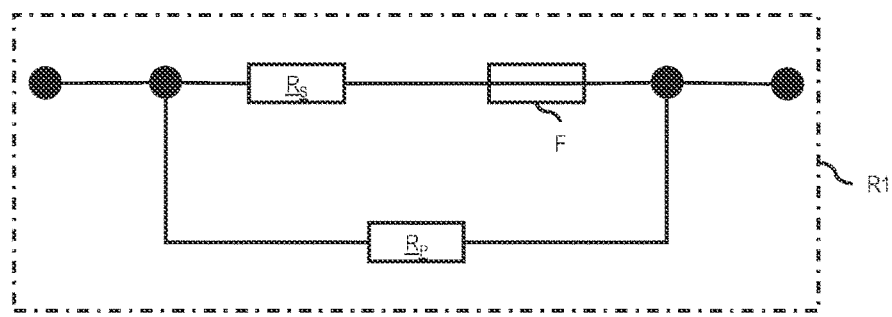
FIG. 1 shows a resistor network for an apparatus for compensating for resistance tolerances of a fuse for a circuit in accordance with the invention.

The resistor network R1 shown in FIG. 1 for compensating for resistance tolerances comprises, as well as a tolerance-affected fuse F, a first resistor $R_S$, which is connected in series with the fuse, and a second resistor $R_P$, which is connected in parallel with the fuse F and with the first resistor $R_S$. The resistor network R1 has, at a predefined ambient temperature, such as 25° C., a resistance that corresponds to a desired total resistance.

In the present exemplary embodiment, the fuse F has a tolerance, with respect to its resistance, of at least 5% at the predefined ambient temperature. The fuse F has a tolerance, with respect to its resistance, of at least 20% within a predefined temperature range, such as from −40° C. to 80° C. Without compensation, this would result in significant tolerances of the resistance of a resistor network comprising the fuse F, in particular if the fuse has, within the predefined temperature range, a temperature coefficient of 0.4% per degree Kelvin or higher.

The resistance of the second resistor $R_P$ is selected depending on a power input into the resistor network R1 in a fault state and/or depending on a predefined tolerance of the resistance of the resistor network R1, and is a multiple of that of the first resistor $R_S$. Preferably, the resistance of the second resistor $R_P$ is predefined depending on a power input into the resistor network R1 when the fuse F melts, such that the first resistor $R_S$ can be established with an appropriately low value. In relation to the first resistor $R_S$, the second resistor $R_P$ may have, for example, a resistance value at least ten times higher. A configuration according to which, within the predefined temperature range, the first resistor $R_S$ and/or the second resistor $R_P$ have a tolerance, with respect to the respective resistance thereof, of at most 0.1% proves particularly advantageous for a low tolerance of the resistance of the resistor network R1.

Combining the fuse F with a parallel and a series resistor makes it possible to compensate effectively and efficiently for the tolerance of the resistance of the fuse F within the resistor network R1. This is illustrated below via several numerical examples.

If, for example, a fuse F with a resistance of between 2.5 ohms and 5 ohms at a predefined ambient temperature is used (3.75 ohms±33.3% at 25° C.) and the fuse F has a temperature coefficient of 0.6% per degree Kelvin, this results in a resistance of the fuse F of between 1.04 ohms and 6.8 ohms over an entire temperature range of from −40° C. to 105° C. This corresponds to 3.92 ohms±73.5% over the entire temperature range. If, for example, a terminating resistance of 50 ohms is required for a signal line, then the tolerance of the resistance of the fuse F can already be compensated for to a limited extent via a first resistor $R_S$ with a value of 46.25 ohms (50 ohms-3.75 ohms) and a tolerance of ±1% over the entire temperature range. This results, depending on batch and temperature range, in a total resistance of between 46.83 ohms (1.04 ohms+46.25 ohms*99%) and 53.51 ohms (6.8 ohms+46.25 ohms*101%). This corresponds to a total resistance of 50 ohms±7.02% over the entire temperature range.

Additional compensation for the tolerance of the resistance of the fuse F is achieved if a second resistor $R_P$ in parallel with a series circuit consisting of the fuse F and the first resistor $R_S$ is additionally used. If, for example, a first resistor $R_S$ with a value of 52 ohms±1% (over the entire temperature range) and a second resistor $R_P$ with a value of 510 ohms±1% (over the entire temperature range) are used, this then results in a minimum total resistance of 47.57 ohms (1/(1/510 ohms*99%+1/(52 ohms*99%+1.04 ohms))) and a maximum total resistance of 53.19 ohms (1/(1/510 ohms*101%+1/(52 ohms*101%+6.8 ohms)). This corresponds to a total resistance of 50.26 ohms±5.85% over the entire temperature range. In comparison with the series circuit consisting of the fuse F and the first resistor $R_S$, this results in the tolerance of the total resistance being reduced by 1.18%. In addition, if the fuse F melts, then the second resistor $R_P$ with a value of 510 ohms means that a sufficiently high total resistance remains for limiting the current or power in potentially explosive environments.

If a first resistor RS with a value of 47.5 ohms±1% (over the entire temperature range) and a second resistor $R_P$ with a value of 2 kiloohms±1% (over the entire temperature range) are used, then the tolerance of the total resistance is increased to ±6.72%. However, there is a reduction in the power input into the resistor network R1 if the fuse F melts. Conversely, if a first resistor RS with a value of 71.5 ohms±1% and a second resistor $R_P$ with a value of 150 ohms±1% are used, then the tolerance of the total resistance is reduced to ±3.61%. However, in this case, there is an increase in the power input if the fuse melts. It has to be weighed up on a case-by-case basis how much power input into the resistor network R1 in the fault state or if the fuse melts should be permissible. The resistor network R1 can be dimensioned accordingly.

Figure 2:
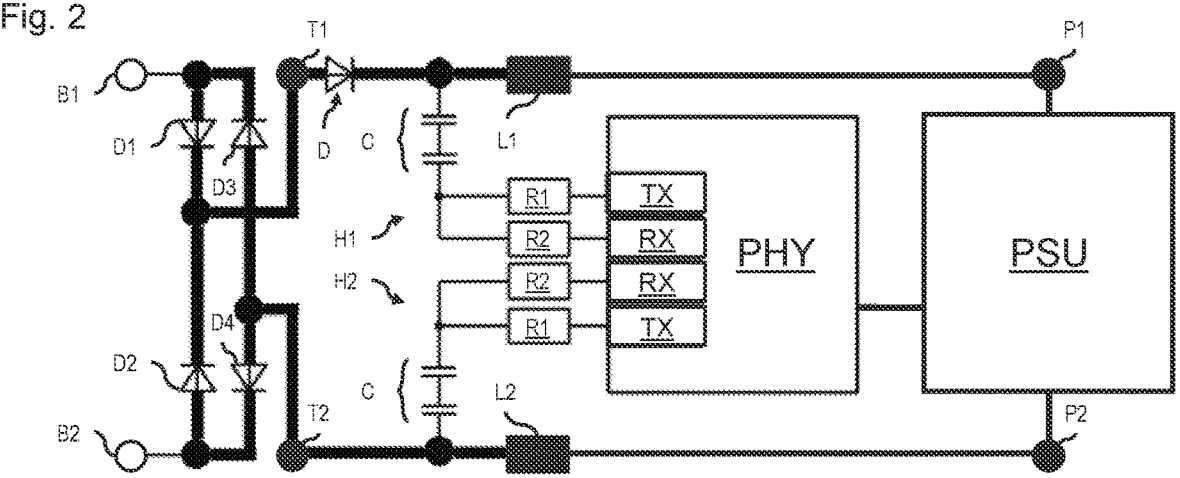
FIG. 2 shows a communication device for a 2-wire Ethernet bus system, which is established for high data transmission rates with simultaneously high supply power in accordance with the invention.

The resistor network R1 shown in FIG. 1 is preferably used in a line driver of a communication device for a 2-wire Ethernet bus system of FIG. 2. The resistor network R1 forms in each case a low-value resistor that is protected by the fuse F and is comprised of a first high-pass filter arrangement H1 and a second high-pass filter arrangement H2, respectively. The two high-pass filter arrangements H1-H2 are connected to a first and a second transmission unit TX, respectively, of a PHY interface apparatus PHY of the communication device. Moreover, the two high-pass filter arrangements H1-H2 each comprise a high-value resistor R2 and a capacitor arrangement C with at least two series-connected capacitors.

In the present exemplary embodiment, the communication device is configured in accordance with Ethernet Advanced Physical Layer and has a bridge rectifier that comprises four rectifier diodes D1-D4, two bus-side connections B1-B2 and two device-side connections T1-T2. In particular, the communication device comprises a bus input for connection to multiplexed supply lines of the 2-wire Ethernet bus system, which are configured to transmit energy and data simultaneously. The bus input is formed by the bus-side connections B1-B2 of the bridge rectifier.

The PHY interface apparatus PHY is intended for coding and decoding data interchanged between the communication device and the 2-wire Ethernet bus system. The PHY interface apparatus PHY is connected to a cathode of a diode D via the first high-pass filter arrangement H1, and to the second device-side connection T2 of the bridge rectifier via the second high-pass filter arrangement H2. In particular, the PHY interface apparatus PHY is configured for differential data signal transmission and therefore comprises two transmission units TX and two reception units RX.

The low-value resistors R1 of the high-pass filter arrangements H1-H2, which resistors are each formed by a resistor network in accordance with the disclosed embodiments, are each connected to a transmission unit TX and to the respective capacitor arrangement C. By contrast, high-value resistors R2 are each connected to a reception unit RX and to the respective capacitor arrangement C. The capacitor arrangement C of the first high-pass filter arrangement H1 is connected to the cathode of the diode D, while the capacitor arrangement C of the second high-pass filter arrangement H2 is connected to the second device-side connection T2 of the bridge rectifier. Preferably, the low-value resistors R1 have an impedance of 50 ohms, and the high-value resistors R2 have an impedance of 2-5 kiloohms.

As shown in FIG. 2, an anode of a first rectifier diode D1 is connected to a first bus-side connection B1, while a cathode of the first rectifier diode D1 is connected to a first device-side connection T1. Similarly, an anode of a second rectifier diode D2 is connected to a second bus-side connection B2, while a cathode of the second rectifier diode D2 is connected to the first device-side connection T1. Moreover, a cathode of a third rectifier diode D3 is connected to the first bus-side connection B1, while an anode of the third rectifier diode D3 is connected to a second device-side connection T2. Furthermore, a cathode of a fourth rectifier diode D4 is connected to the second bus-side connection B2, while an anode of the fourth rectifier diode D4 is connected to the second device-side connection T2.

The communication device additionally comprises a power supply unit PSU, which is connected, via a first coil L1, to the cathode of the diode D, the anode of which is connected to the first device-side connection T1 of the bridge rectifier. The power supply unit PSU is connected to the second device-side connection T2 of the bridge rectifier via a second coil L2. The power supply unit PSU is formed as a DC voltage power supply unit, and is connected to the first coil L1 via a first power supply unit connection P1, while a second power supply unit connection P2 is connected to the second coil L2. The two coils L1-L2 form a low-pass filter arrangement for the power supply unit PSU. The two coils L1-L2 are each connected to the power supply unit PSU without any additional freewheeling diode arrangements connected in parallel therewith.

Depending on a connection of the communication device to the 2-wire Ethernet bus system, a freewheeling diode arrangement for the two coils L1-L2, which comprises in three diodes each arranged in series, is formed either by the first rectifier diode D1, the diode D and the fourth rectifier diode D4, or by the second rectifier diode D2, the diode D and the third rectifier diode D3. Preferably, the bridge rectifier is established for use in an intrinsically safe circuit and has a safe connection to inductors to be protected, namely the coils L1-L2, in accordance with IEC60079-11.

In accordance with an alternative embodiment, which is not explicitly shown in the figures, the power supply unit PSU is connected, via the first coil L1, directly to the first device-side connection T1 of the bridge rectifier rather than to the diode D. Here, the diode D is connected to the bridge rectifier on the bus input side rather than on the device side. In this case, the anode of the diode D is connected to a first bus connection of the communication device, while the cathode of the diode is connected to the first bus-side connection B1 of the bridge rectifier. In the alternative embodiment, the second bus-side connection B2 of the bridge rectifier forms a second bus connection of the communication device. The two bus connections of the communication device are not interchangeable in the alternative embodiment.

In the present exemplary embodiment, the bridge rectifier, the diode D, the first coil L1, the second coil L2, the first high-pass filter arrangement H1 and the second high-pass filter arrangement H2 form a line driver integrated in the communication device. In principle, a line driver of this kind may also be formed as an external or separate device and can be used to upgrade existing communication devices for high data transmission rates with a simultaneously high supply power. In the case of applications of this kind, coils associated with a power supply unit are also always protected via a total of three diodes in series.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for compensating for resistance tolerances of a tolerance-affected fuse of a circuit, the apparatus comprising:
a first resistor connected in series with the tolerance-affected fuse; and
a second resistor connected in parallel with the tolerance-affected fuse and with the first resistor;
wherein the apparatus has, at a predefined ambient temperature, a resistance which corresponds to a desired total resistance; and
wherein a resistance of the second resistor, comprising a resistance value at least ten times higher in relation to the first resistor, is selected depending on at least one of
(i) a power input into the apparatus in a fault state and
(ii) a predefined tolerance of the resistance of the apparatus.

2. The apparatus as claimed in claim 1, wherein the tolerance-affected fuse has a tolerance, with respect to its resistance, of at least 5% at the predefined ambient temperature.

3. The apparatus as claimed in claim 2, wherein the tolerance-affected fuse has a tolerance, with respect to its resistance, of at least 20% within a predefined temperature range.

4. The apparatus as claimed in claim 1, wherein the tolerance-affected fuse has a tolerance, with respect to its resistance, of at least 20% within a predefined temperature range.

5. The apparatus as claimed in claim 4, wherein the tolerance-affected fuse has a temperature coefficient of at least 0.4% per degree Kelvin within the predefined temperature range.

6. The apparatus as claimed in claim 5, wherein at least one of the first resistor and the second resistor has a tolerance, with respect to a respective resistance of at most 0.1% within the predefined temperature range.

7. The apparatus as claimed in claim 5, wherein the predefined temperature range comprises at least a range between −40° C. and 80° C.

8. The apparatus as claimed in claim 4, wherein at least one of the first resistor and the second resistor has a tolerance, with respect to a respective resistance of at most 0.1% within the predefined temperature range.

9. The apparatus as claimed in claim 8, wherein the predefined temperature range comprises at least a range between −40° C. and 80° C.

10. The apparatus as claimed in claim 4, wherein the predefined temperature range comprises at least a range between −40° C. and 80° C.

11. The apparatus as claimed in claim 1, wherein the predefined ambient temperature is 25° C.

12. The apparatus as claimed in claim 1, wherein the resistance of the second resistor is predefined depending on a power input into the apparatus when the tolerance-affected fuse melts.

13. A line driver for a communication device comprising a physical layer (PHY) interface apparatus, the line driver comprising:
a bridge rectifier comprising two bus-side connections and two device-side connections;
a first high-pass filter arrangement which is connectable to a first transmission unit of the PHY interface apparatus of the communication device; and
a second high-pass filter arrangement which is connectable to a second transmission unit of the PHY interface apparatus of the communication device;
wherein the first high-pass filter arrangement and the second high-pass filter arrangement each comprise an apparatus as claimed in claim 1.

14. The line driver as claimed in claim 13, wherein the line driver is integrated into the communication device.

* * * * *